United States Patent [19]
Pal et al.

[11] Patent Number: 5,314,524
[45] Date of Patent: May 24, 1994

[54] PROCESS OF DISCHARGING CHARGE-BUILD UP IN SLAG STEELMAKING PROCESSES

[75] Inventors: Uday B. Pal, Malden; Gopala K. M. Gazula, Somerville, both of Mass.; Ali Hasham, Karachi, Pakistan

[73] Assignee: MIT (Mass. Institute of Technology), Cambridge, Mass.

[21] Appl. No.: 843,742

[22] Filed: Feb. 28, 1992

[51] Int. Cl.$^5$ .............................................. C21B 11/10
[52] U.S. Cl. .................................. 75/10.35; 75/10.63; 75/433; 75/500
[58] Field of Search ................... 75/10.1, 10.12, 10.15, 75/10.35, 10.63, 433, 500, 10.46

[56] References Cited

U.S. PATENT DOCUMENTS 3,817,502  6/1974  Taylor .................................... 75/525

FOREIGN PATENT DOCUMENTS 1242529  7/1986  U.S.S.R. ................................ 75/10.1

Primary Examiner—Melvyn J. Andrews
Attorney, Agent, or Firm—Bruce F. Jacobs

[57] ABSTRACT

A process and apparatus for improving metal production in ironmaking and steelmaking processes is disclosed. The use of an inert metallic conductor in the slag-containing crucible and the addition of a transition metal oxide to the slag are the disclosed process improvements.

11 Claims, 6 Drawing Sheets

PROCESS OF DISCHARGING CHARGE-BUILD UP IN SLAG STEELMAKING PROCESSES

U.S. GOVERNMENT RIGHTS

The U.S. government has rights in this invention by virtue of U.S. Department of Energy Grant No. DE-FC07-89ID12847.

BACKGROUND OF THE INVENTION

The rate of reduction of iron oxides dissolved in calcium-silicate slags by iron-carbon melts is an important factor in ironmaking and steelmaking processes in general and, in particular, in in-bath smelting steelmaking processes. It has been reported that the rate of metal production during in-bath smelting processes increases with increased slag volume in the smelter. The $CaO$-$SiO_2$-$Al_2O_3$-$FeO$ slag in an in-bath smelting vessel also contains gases, solid carbon, and metal droplets. An analysis of metal production rates in a 170 ton in-bath smelting reactor revealed that the reaction rates at the interfaces of slag-droplet and slag-carbon are equal to those at metal-slag interface [T. Ibaraki, M. Kanemoto, S. Ogata, H. Katayama, and H. Ishikawa: *Steelmaking Conference Proceedings*, Vol. 73, 1990.] Thus, the Fe-C droplets in the slag phase play an important role during the bath smelting of iron oxides and, therefore, understanding the reactions at the droplet interface is crucial.

There have been several studies in the past investigating the behavior of Fe-C droplets in the slags. The reduction rates of FeO dissolved in $CaO$-$SiO_2$-$Al_2O_3$ slags by Fe-C droplets have been experimentally determined by Sawada [Yasushi Sawada: M. S. Thesis, Massachusetts Institute of Technology, Cambridge, 1990.] The important observation from these previous investigations is that there were two distinct regimes of reaction rates—one very fast and other very slow. The faster rates were observed in the initial period of the reaction and the period lasted between 60 to 300 sec. depending on the slag composition and temperature. This faster reaction was found to be zeroth order with respect to carbon in the droplet. The reaction rate in the second stage was very slow and the reaction virtually stopped when carbon in the droplet reached a particular level (approximately 2 wt %).

As a result, the reduction reaction is unable to go to completion leaving slag with FeO and Fe-C, which creates a relatively high carbon intermediate. Additional processing conventional in iron and steelmaking processes must be employed to convert the high carbon intermediate. This appears to be a rate limiting step which directly affects the production of metal (iron) and its subsequent conversion to steel. The prior art does not suggest how the reduction reaction can be forced to completion or how to increase the rate of reaction.

Accordingly, an object of the present invention is to develop a process to increase the rate of the reduction of iron oxides taking place in a FeO containing slag.

Another object is to completely remove carbon from the iron-carbon droplet resulting in the direct production of steel (low carbon iron).

DISCLOSURE OF THE INVENTION

The present invention is directed to a process for improving the rate of metal production in ironmaking and steelmaking processes which uses a FeO containing slag. The process generally comprises two separate processing steps, which may be used in combination to achieve maximum improvement, or either processing step may be used alone while still achieving improvement in the rate of metal production and better utilization of the iron oxide.

One of the processing steps generally comprises discharging a charge build-up in the slag, used in the production of steel, particularly the charge build-up around the Fe-C metal droplets dispersed in the slag. The discharging is accomplished by the use of an inert metallic conductor disposed in a container containing the slag. The discharging of the charge build-up around the Fe-C droplets results in increasing the rate of the reduction reaction and the reduction reaction going to substantial completion. Thus, a high content of Fe metal with little or no carbon in the slag is obtained. The need to proceed through a high carbon content Fe intermediate in making steel is thereby eliminated.

The other processing step which also improves metal production efficiency comprises adding to the FeO containing slag a transition metal oxide in an amount sufficient to increase the reduction rate of FeO in the slag. A reduction rate increase of up to about 75% as compared to the reduction rate of FeO without the addition of any transition metal oxide is achievable. As a result, more Fe metal with lower carbon is produced in the slag in less time from the same amount of initial FeO in the slag.

When these two process steps are used in combination, the overall metal production rate and process efficiency is significantly improved. The process of the present invention is useful in a variety of iron and steelmaking processes including direct reduction of iron, continuous steelmaking, converter steelmaking, electric steelmaking, and in-bath smelting processes for steelmaking.

DETAILED DESCRIPTION OF THE PREFERRED EMBODIMENTS

In ironmaking and steelmaking processes, slags comprising $CaO$-$SiO_2$-$FeO$-$Al_2O_3$ are employed. The ratio of the oxide components vary depending upon the process being employed and the type of steel being produced. A typical weight percent of CaO, $SiO_2$, and $Al_2O_3$ in slags is about 40–45, 35–40, 10–15, respectively. The slags may also contain other additives such as MgO, MnO, S, P, C, etc. in varying amounts. In addition, the slags of the present invention contain Fe-C metal droplets. As used in this application, the term "slag" includes all of those slags described hereinabove.

The rate of reduction of iron oxides dissolved in calcium silicate slags by Fe-C metal droplets is important in the direct reduction of iron and in various steelmaking processes. The initial reduction rate of FeO in slags by Fe-C droplets, in the temperature ranges of 1623° K. to 1873° K., is first order in FeO concentration and zeroth order in carbon. However, when the carbon concentration in the metal droplets falls below about 2.7% by weight the reduction reaction virtually ceases to occur leaving Fe-C. The overall reduction reaction taking place in the slag is shown generally as:

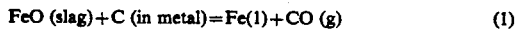

Figure 1:
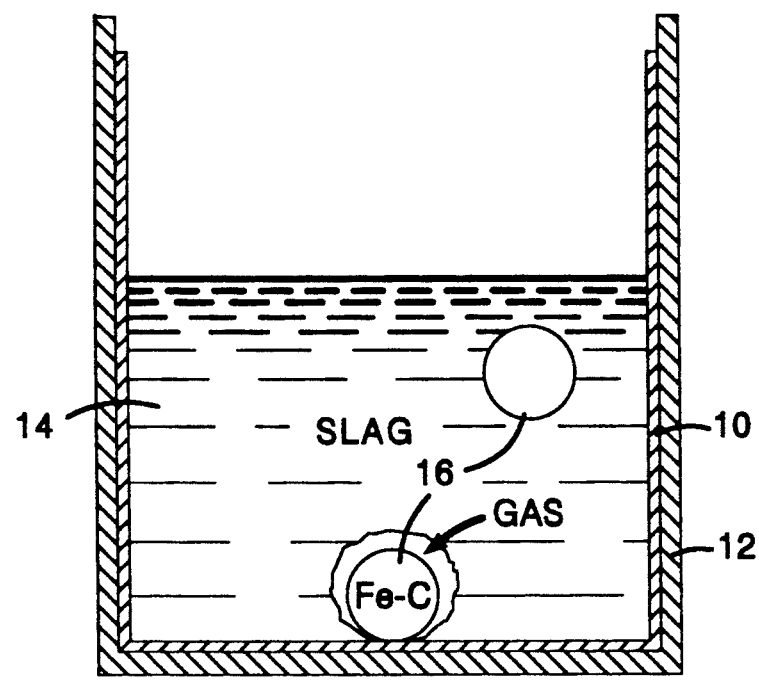
FIG. 1 is a schematic view of the apparatus of the present invention.

During the processing of the slag in the production of iron and steel, it is presently believed that the charge build up in the slag layer adjacent and on the surface of the metal droplets prevents the oxygen in FeO from reacting with the carbon thereby preventing the reaction from going to completion. Whether or not this is the mechanism of reaction, it has now been found that by discharging this charge the reduction reaction continues until the C in the Fe droplet decreases to about 0.2%. The discharging of the charge is accomplished by means of an inert metal conductor disposed in the container in which the slag is disposed and in which the process is being carried out. The metallic conductor may be in any suitable form including a foil, a plate, a liner or coating disposed on the interior surface or portion thereof of the container, or a wire disposed in the container, such that it is disposed between the FE-C droplet and the slag. As best shown in FIG. 1, it is presently preferred to use a liner 10 on the interior surface of container 12 having disposed therein slag 14 containing dispersed metal droplets Fe-C 16 which settle through the slag and contact the liner. The liner 10 is held in place by the weight of the slag.

The inert metallic conductor may be selected from any suitable metal including molybdenum, iridium, platinum, paladium and tungsten. It, however, is presently preferred to use Mo. The metallic conductor must be present in an amount sufficient to substantially completely discharge the charge surrounding the droplet in the slag. The exact amount will depend upon the number of metal droplets and the amount of slag. It has been found that the placement of the conductor only along the base and the interior walls of the container so that it contains the slag and extends out of the slag surface, as is shown in FIG. 1 provides excellent results.

As a result of discharging the charge surrounding the metal droplet in the slag, the reduction reaction increases and goes to substantial completion and the amount of liquid metal in the slag increases. Thus, the rate of production of metal increases. Moreover, by substantially eliminating the carbon from the Fe-C droplet in the slag, there is no need to proceed through a relatively high carbon content iron intermediate to arrive at the final product which may be low carbon steel. Instead, a single step process is now possible, eliminating additional cost and time consuming steps, to produce low carbon steel.

This processing step may be used alone or combined with a second processing step. The second processing, which also may be used alone, does not result in the reduction reaction going to completion. Rather, it results in an increase in the rate of the reduction reaction. It has been found that the initial stage of the reduction reaction (the stage that is zeroth order in carbon) is controlled by slag phase mass transport of ions across a concentration boundary layer adjacent to the metal droplets. The second processing step of this invention increases the diffusivity (mass transport) of ions across the concentration boundary layer by increasing the electronic charge concentration in the slag. This is accomplished by adding to the slag one or more transition metal oxides such as $TiO_2$, $Ta_2O_5$, or $Nb_2O_5$. Presently preferred transition metal oxides include $TiO_2$ and $Nb_2O_5$. A single transition metal oxide or a combination of one or more such metal oxides may be employed. The transition metal oxide is generally present in an amount which increases the electronic conductivity without lowering the ionic and/or the overall electrical conductivity. The electronic conductivity can be measured by means known in the art such as described in Uday Pal., T. Debroy, and G. Simkovich: *Metall. Trans.*, 16B (1985), pp. 77–82. It has been found that the addition of about 2.30% by weight of $TiO_2$ or about 1.8% by weight of $Nb_2O_5$ to a slag increases the initial reduction rate by about 75%. The transition metal oxide is generally added prior to the addition of Fe-C. Even with the addition of the metal oxide the reduction reaction virtually stops when the percentage of C in the Fe-C droplet is between about 2 to 3% by weight. Nevertheless, the increase in reduction rate alone will make the process more efficient since more metal can be produced from the same initial amount of FeO in the slag in a shorter period of time. When combined together with the discharging of charge build up step described above, iron and steelmaking processes will benefit in terms of increased and faster metal production rate and elimination of a relatively high carbon content Fe-C droplets in the slags by transforming them into Fe metal droplets with little or no carbon.

The present invention will now be described with reference to the following Examples. It is understood that these Examples are for illustration purposes only and should not be deemed as limiting this invention.

EXAMPLE 1

Six separate experiments were carried out to show the improvements of the present invention particularly those involving the addition of a transition metal oxide. The experiments were carried out using equipment comprising a sealed induction furnace, a pressure transducer, a data acquisition system, and flash X-ray equipment. The furnace had a cylindrical shaped mullite tube of 300 mm in diameter. The furnace was insulated using four layers (total insulation layer thickness was 30 mm) of graphite felt. A pure graphite cylindrical tube was used as the susceptor and the wall thickness (12.7 mm) of the susceptor was chosen such that the induction currents never penetrate beyond the susceptor walls. The furnace tube had top and bottom water-cooled brass closure plates, the top one having five access ports: one each for a thermocouple, a pyrometer sighting tube, a tube to mount a pressure gauge, a feed port which also had a turbulation through which argon for purging the system can be introduced, and a port for off gas. The furnace was heated using a 50 kW, 3000 Hertz, motor-generator set (Tocco) with water cooled induction coils placed around the furnace tube. The equipment consisted of induction coils for heating the contents of the furnace through a graphite susceptor. A graphite crucible stand (155 mm inner diameter) was used to protect the graphite susceptor from the molten slag which might leak out from the alumina crucible if there is a failure of the crucible. The furnace temperature was monitored and controlled with a two-color optical pyrometer and P-controller (Ircon Model No: R99C10). The temperature controller was calibrated periodically with a Pt-Pt/10% Rh thermocouple. The controller can maintain the furnace temperature at the set point within ±1 K.

The pressure transducer (Omega model PX 105) was connected to the top plate by a copper tube. The signal generated by the pressure transducer was converted into digital signals by the DATA ACQUISITION SYSTEM AI 13 (Interacture Structure Inc.). During the experiment, the data was recorded by an Apple II personal computer which was later transferred to an IBM PS/2PC.

The X-ray equipment was Hewlett Packard flash X-ray system—Model 43733A. The equipment consisted of an X-ray tube (Model No. 5155) which could be energized through a pulsar in order to obtain a flash X-ray beam for a short duration of time (100 ns). The energy levels used were up to the maximum chargeable level (300 kV) of the pulsar. The system had the following characteristics: output voltage (nominal) of 300 kV; pulsar current (nominal) of 5,000 A; dose (nominal) at 38 cm of single tube 55 m R and dual tube 5 mm; exposure time (pulse width) of 100 ms and penetration of 0.55 meter of 29 mm of steel.

Two lead collimation plates were installed between the X-ray and the furnace so that the radially emitted X-ray could be absorbed. Only the X-rays which were originally emitted in the direction of the observed site were allowed to pass. It was important to absorb the radially emitted X-rays, because if allowed to pass they would make the X-ray image fuzzy.

The distances between the X-ray source and the sample, the sample and the X-ray film affect the thickness of the fuzzy edge of the X-ray picture image. Increasing the distance between the X-ray source and the sample, decreased the fuzziness as well as the intensity of the image. Taking these trade offs into consideration, the picture quality was best when the distance between the X-ray source and the sample, the sample and the X-ray film were 550 mm and 95 mm, respectively.

Both the slag and the Fe-C droplets used in the experiments were prepared using a different induction furnace which was heated employing a 15 kW Tocco motor generator. The furnace consisted of a silica tube furnace tube (154 mm OD, 148 mm ID, 455 mm long). The slags were prepared using an iron crucible (52 mm inner diameter, 230 mm long), and the Fe-C alloy were made in a pure (99.8%) alumina crucible (35 mm inner diameter, 104 mm long).

The temperature was measured with a Leeds and Northrup disappearing filament-type pyrometer, (Ser. No: 13595), sighted through a viewing port positioned in the middle of the top brass lid.

The pre-fused slag used in the experiment was prepared in a separate induction furnace by heating a powder mixture of CaO (>98% pure), amorphous $SiO_2$ (>99%, 1-5 μm), $Al_2O_3$ (99.8%, 5 μm), $Fe_2O_3$(>99.7%), and Fe(99.9%, −250 mesh). In several experiments, the base slag also contained $TiO_2$ (99.9%, 325 mesh) or $Nb_2O_5$ (>99.9%). The ratio of CaO, $SiO_2$, and $Al_2O_3$ in the powder mixture was always kept at 45%, 40%, and 15%, respectively. An iron crucible (52 mm inner diameter and 230 mm long) was used to obtain an iron saturated slag. A piece of pre-fused slag was used as a seed to make the solid powder mixture fusing process faster. The contents of the iron crucible were heated slowly till the powder mixture fused and melted. The melt was stirred several times starting from the onset of melting to the end when the melt reached 1623° K. The furnace was purged with argon throughout the experiment in order to prevent the oxidation of the iron crucible and to avoid the contamination of the final slag with iron oxides. The crucible with the molten slag was taken out of the furnace at once and poured on to a chilled water cooled copper plate. The molten slag was solidified in about 10–20 sec. after pouring it onto the copper plate. The types of slags used and their compositions are given in Table 1. In spite of the care taken during the experiments, the final FeO in the prefused slag was always more than the aimed composition. Table 2 gives the comparison of the aimed FeO level in the slag versus the final FeO level in the slag.

TABLE 1

COMPOSITION OF THE DIFFERENT SLAGS USED IN THE EXPERIMENTS:

| Slag Type | % FeO | % $TiO_2$ | % $Nb_2O_5$ | % CaO | % $SiO_2$ | % $Al_2O_3$ |
|---|---|---|---|---|---|---|
| S6 | 5.14 | — | — | 43.79 | 40.03 | 11.04 |
| S7 | 5.48 | — | — | 43.70 | 39.65 | 11.16 |
| S8 | 5.25 | — | — | 45.16 | 38.58 | 11.01 |
| T1 | 5.26 | — | — | 44.02 | 40.54 | 10.18 |
| T2 | 9.04 | 1.49 | — | 40.38 | 39.94 | 9.15 |
| T3 | 5.85 | 2.97 | — | 41.32 | 40.43 | 10.94 |
| T4 | 7.74 | 4.19 | — | 38.71 | 36.13 | 13.23 |
| T5 | 5.58 | 5.52 | — | 40.45 | 37.64 | 10.81 |
| N1 | 5.76 | — | 1.79 | 40.46 | 40.46 | 11.52 |

TABLE 2

TARGETED VERSUS ACTUAL FeO LEVELS IN THE SLAG

| Slag Type | FeO (%) Actual | FeO (%) Target |
|---|---|---|
| S1 | 5.6 | 4.3 |
| S2 | 4.5 | 4.3 |
| S3 | 6.77 | 6.0 |
| S4 | 7.26 | 7.0 |
| S5 | 8.4 | 7.5 |
| S6 | 5.14 | 4.76 |
| S7 | 5.48 | 4.76 |
| S8 | 5.25 | 5.0 |
| T1 | 5.26 | 4.76 |
| T2 | 9.04 | 4.67 |
| T3 | 5.85 | 4.59 |
| T4 | 7.74 | 4.5 |
| T5 | 5.58 | 4.59 |
| N1 | 5.76 | 5.0 |

The Fe-C droplets and pellets used in the experiments were obtained by heating a mixture of electrolytic iron (>99.99% pure) and graphite powder (99.9% pure) in an induction furnace. An alumina crucible (35 mm inner diameter and 104 mm long) was used for the purpose. A number of cylindrical pin-samples were drawn from the melt at 1823° K. and rapidly chilled. The required size and shape of the droplet was obtained by grinding a piece of the solidified sample. The chilled samples were analyzed chemically for carbon, sulfur, and silicon. The carbon content of the samples was adjusted by varying the amount of graphite powder added to the pre-melted electrolytic iron. The droplets were also examined microscopically for any visible carbon segregations in the samples.

The droplet experiment was conducted by slowly heating the furnace to the experimental temperature and loading a known amount of pre-fused basic slag into a pure (99.8%), dense, flat bottom, alumina crucible (54 mm inner diameter and 104 mm long). The furnace was purged with argon throughout the experiment to maintain an inert atmosphere. Then the slag was stirred for about 2 minutes by injecting argon into the molten slag at a rate of $4 \times 10^{-4}$ m$^3$/min. A sample of the molten slag prepared for the Fe-C droplet experiments was taken to get the initial composition of the slag for CaO, SiO$_2$, Al$_2$O$_3$ and FeO. Before beginning the experiments calibration experiments were run to enable CO(g) evolution values to be accurately calculated. The rate of reduction was estimated using the pressure versus time curves obtained during the reduction reactions and the pressure versus volume calibration curves. The pressure-volume relationships were obtained for each data point after a set of calibration experiments. The calibration experiments were conducted for each data point in order to eliminate any possible errors which might be carried over from a pre-conducted calibration experiment. The calibration experiments consisted of measuring the increase in pressure of the closed furnace chamber due to a known amount of CO(g) input to the reactor at the experimental temperature.

The furnace was heated slowly to the required temperature under an argon atmosphere (a constant flow of argon of approximately $1 \times 10^{-5}$m$^3$/minute) and held at the temperature for an hour to bake the reactor. Then, the furnace was closed and the argon flow was stopped. The pressure inside the reactor was monitored with time. The furnace pressure increased with time at a variable rate. The pressure might have increased due to evolution of volatile matters (mainly H$_2$O). After a period of time, the pressure was more or less constant, indicating that the release of volatile matter had more or less stopped. At that point, the argon was replaced with CO(g) and the stability of the furnace pressure was rechecked. Once the furnace had reached complete equilibrium under CO(g) atmosphere, the calibration experiments were started.

The furnace was closed and about $5 \times 10^{-5}$ Nm$^3$ of CO(g) was put in the system. The exact volume of CO(g) was measured using a wet flow meter (Precision, serial no: 12AS-9), while the pressure increase was recorded by the pressure transducer. The pressure was recorded on a P.C. on line for several minutes. Then another pulse of approximately $5 \times 10^{-5}$m$^3$ of CO(g) was pumped into the system. The process was repeated at least four to five times. It was found that the uncertainty in the pressure measurement was 0.5% of the full scale reading (41.34 KPa or 6 psig).

The calibration curves were used to get a relationship between the volume of CO(g) pumped into the system and the corresponding furnace pressure values. The relationship was used to convert values of pressure, $\Delta p$, obtained from the Fe-C droplet experiment into moles of CO(g), $\Delta n_{co}$, generated during the reduction reactions. The relationship is as follows:

$$\Delta n_{co} = 0.037 \times \Delta p$$

The six experiments were conducted in which 2.02 g of Fe-C (4.79% C, 0.0023%S) pellets were dropped in slags containing traces of transition metal oxides (TiO$_2$ and Nb$_2$O$_5$) Table 1 gives composition of the slags containing TiO$_2$ (T1-T5) and Nb$_2$O$_5$(N1). In these experiments, the mass of the slag was much larger than the mass of the Fe-C alloy that was dropped. Therefore, for all practical purposes it can be assumed the slag composition remained unchanged during an experiment, while C in the Fe-C alloy decreased as the reaction proceeded. The rate of reaction was determined by measuring the rate of increase of the pressure within the closed furnace chamber resulting from the gas released by the reactions. The pressure was measured continuously employing a pressure transducer (Omega Eng. Inc. Model No. M100/M200) that was installed in the gas off-take just above the furnace top closure plate. The uncertainty in the pressure measurement was 0.5% of the full-scale reading (41.34 kPa or 6 psig) of the instrument and it was calibrated before each run. The calibration constant was then employed to convert the measured pressure values to the moles of the gas evolved from the reactions. The outputs from the pressure instrument were digitized and recorded on a PC on-line.

Figure 2:
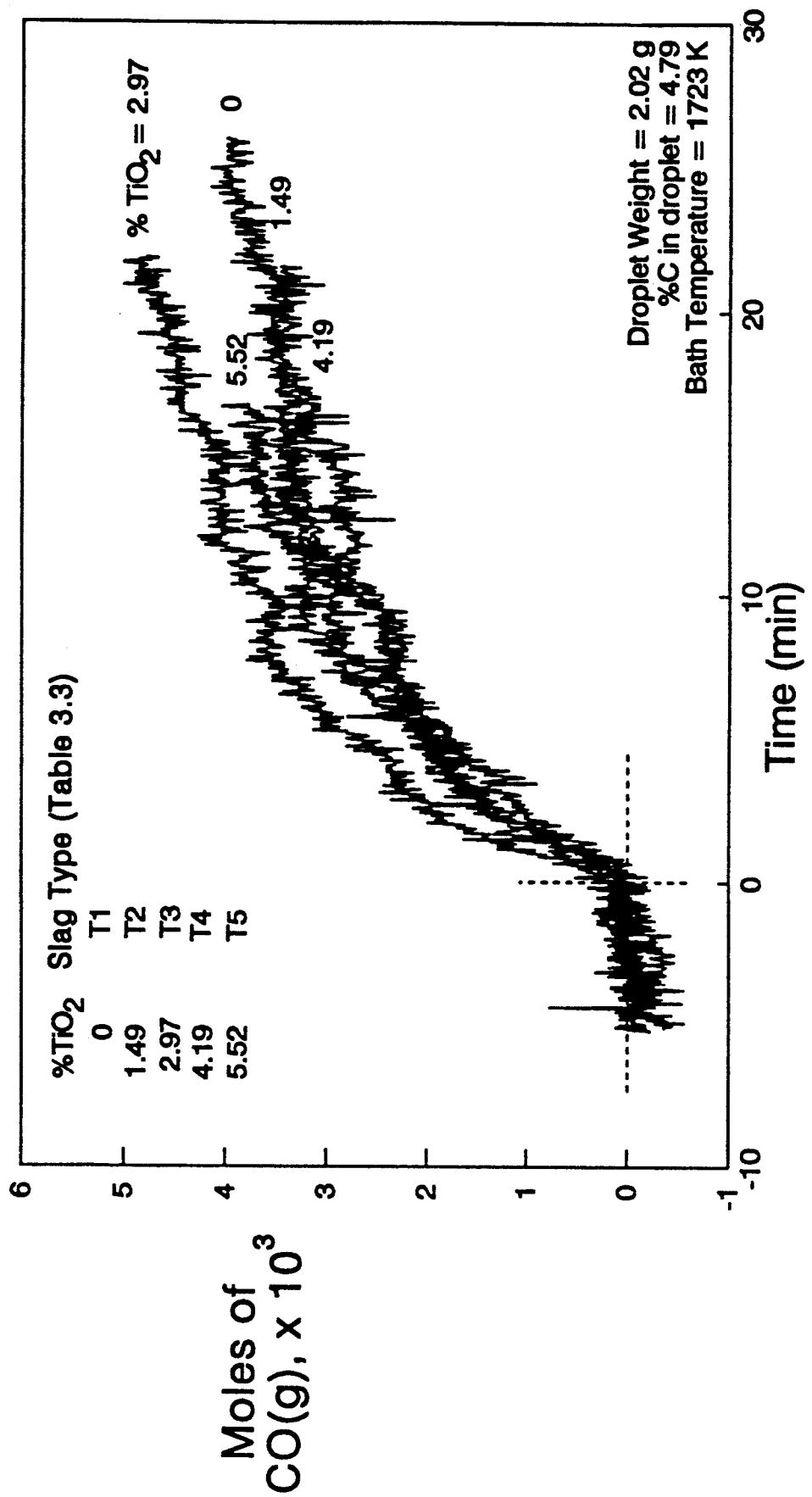
FIG. 2 is a graph showing moles CO(g) as a function of time for certain experiments of Example 1.

The trace of moles of CO(g) evolved from the reaction as a function of time for experiments in which the TiO$_2$ level in the slag varied from 0% to 5.52% (T1-T5) are shown in FIG. 2. Excluding the experiment in which the slag contained 2.97% TiO$_2$, the remaining reactions seemed to proceed at approximately the same rate.

Figure 3:
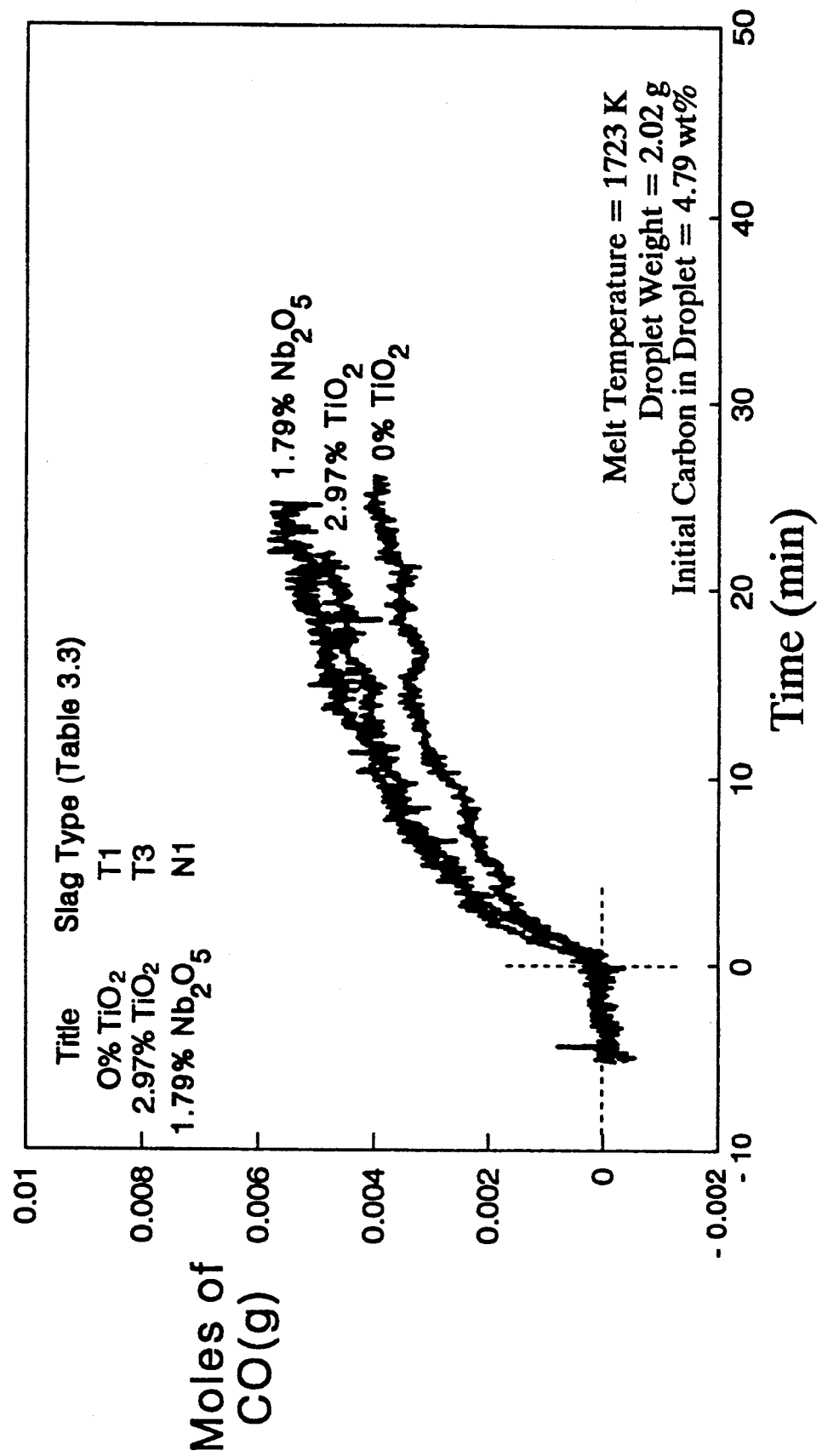
FIG. 3 is another graph showing moles of CO(g) as a function of time for certain experiments of Example 1.

FIG. 3 is a plot of moles of CO(g) generated vs. time for experiments in which the slags T1, T3 and N1 were used. The reaction rate for the experiment using slag containing 1.79% Nb$_2$O$_5$ was similar to the experiment in which the slag contained 2.97% TiO$_2$, and faster than the experiment in which no transition metal oxides were used. Table 3 gives the rates for the first four minutes for the five TiO$_2$ experiments and the Nb$_2$O$_5$ experiment. It was observed that at titania levels greater than 2.97% the reaction slowed down. It is believed that this is due to TiO$_2$ being a network former, and therefore it is possible that at TiO$_2$ levels greater than about 3%, the overall electrical conductivity of the slag gets lowered.

TABLE 3

VARIATION OF REDUCTION RATE AS A FUNCTION OF TiO$_2$ AND Nb$_2$O$_5$ IN SLAGS

| | Rate (mol-CO/s · m$^2$), × 10$^2$ | | | | | |
|---|---|---|---|---|---|---|
| Time (sec) | 0% TiO$_2$ | 1.49% TiO$_2$ | 2.97% TiO$_2$ | 4.19% TiO$_2$ | 5.2% TiO$_2$ | 1.79% Nb$_2$O$_5$ |
| 60 | 3.70 | 3.65 | 7.13 | 2.93 | 4.96 | 3.46 |
| 120 | 3.90 | 3.96 | 6.27 | 3.20 | 4.56 | 4.81 |
| 180 | 3.82 | 3.87 | 5.41 | 3.03 | 4.14 | 4.93 |
| 240 | 3.28 | 3.66 | 4.56 | 2.75 | 3.72 | 4.47 |

As shown in FIGS. 2 and 3, the reduction reaction proceed until about 2-3% C remains, at which point the reaction virtually stops after about 25 minutes.

EXAMPLE 2

Experiments were performed in which an inert metallic conductor (molybdenum foil) was placed in the interior of the alumina crucible such that the slag and the crucible were separated by the molybdenum foil. FIG. 1 is representative of the experimental setup.

Type-C Experiment

In this experiment, a molybdenum foil (0.01 mm thick) was placed in the crucible such that part of the foil was coming out of the slag. A 2.02 g Fe-C (4.79% C, 0.0023% S) droplet was dropped in 110 g of slag (type S6).

Type-D Experiment

As in experiment Type-C, a molybdenum foil (0.01 mm thick) was placed in the crucible such that part of the foil was coming out of the slag. A 2.02 g Fe-C (1.75% C) droplet was dropped in 110 g of slag (type S7).

Type-E Experiments

Three experiment were performed in which molybdenum foil of thickness 1 mm, 0.11 mm, and 0.01 mm were placed only at the base of the crucible such that the foil was completely covered by the slag. A 2.02 g Fe-C droplet (4.79%C, 0.0023% S) was dropped in a slag bath. The slag composition for experiment in which the 0.11 mm thick molybdenum foil was used was type S8.

The experiments were carried out at 1723° K. in an alumina (99.8% pure) crucible of 44 mm inner diameter. The reaction rate was monitored by measuring the increase in the pressure in the closed system as a function of time. The pressure values were converted to CO(g) as described in Example 1.

Figure 4:
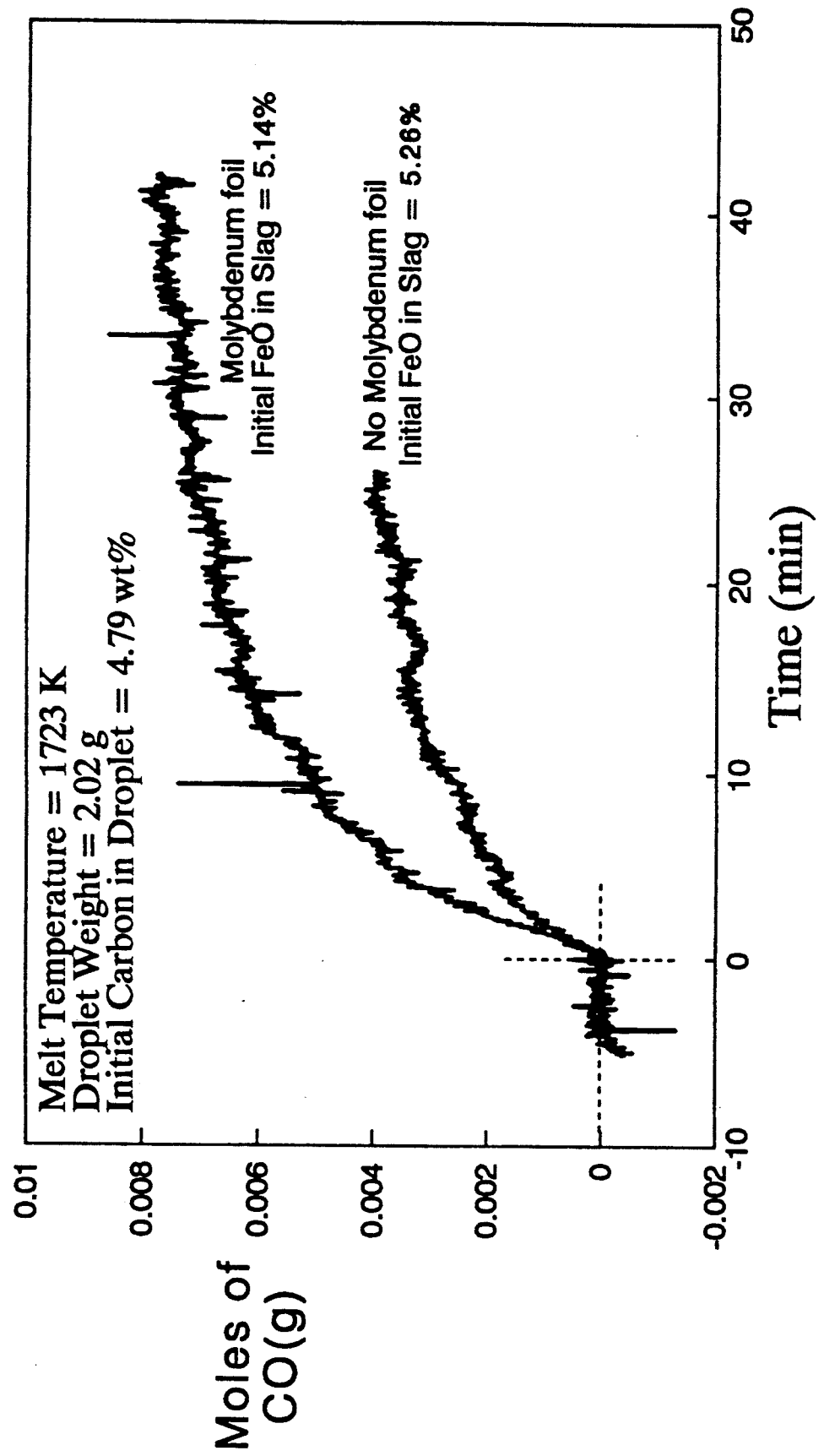
FIGS. 4 and 5 are two graphs showing moles of CO(g) as a function of time for certain experiments of Example 2.

FIG. 4 is a comparison of moles of CO(g) generated versus time for Type-C experiment and an experiment in which no molybdenum foil was used. The Type-C experiment with molybdenum foil proceeded to a much greater extent than the experiment in which no molybdenum foil was used. This clearly indicated that molybdenum foil assisted the reaction in proceeding beyond 2% C. A comparison of the reduction rates for the first 600 s obtained for Type-C experiment and for the experiment in which no molybdenum foil was used is given in Table 4. The results in Table 4 and FIG. 4 show that not only did the molybdenum foil make the reaction proceed to a greater extent, but is also increased the reduction rate in the initial stages.

TABLE 4

A COMPARISON OF REDUCTION RATE FOR EXPERIMENT TYPE-C AND AN EXPERIMENT IN WHICH NO MOLYBDENUM FOIL WAS USED.

| | Rate (mol-CO/s · m$^2$), × 10$^2$ | |
|---|---|---|
| Time (sec.) | no molybdenum foil | molybdenum foil (type C) |
| 60 | 3.70 | 4.59 |
| 120 | 3.90 | 6.59 |
| 180 | 3.82 | 6.21 |
| 240 | 3.28 | 6.09 |
| 300 | 2.75 | 5.62 |
| 360 | 2.77 | 5.02 |
| 420 | 2.58 | 4.83 |
| 480 | 2.32 | 4.66 |
| 540 | 2.13 | 4.27 |
| 600 | 2.15 | 3.93 |

Figure 5:
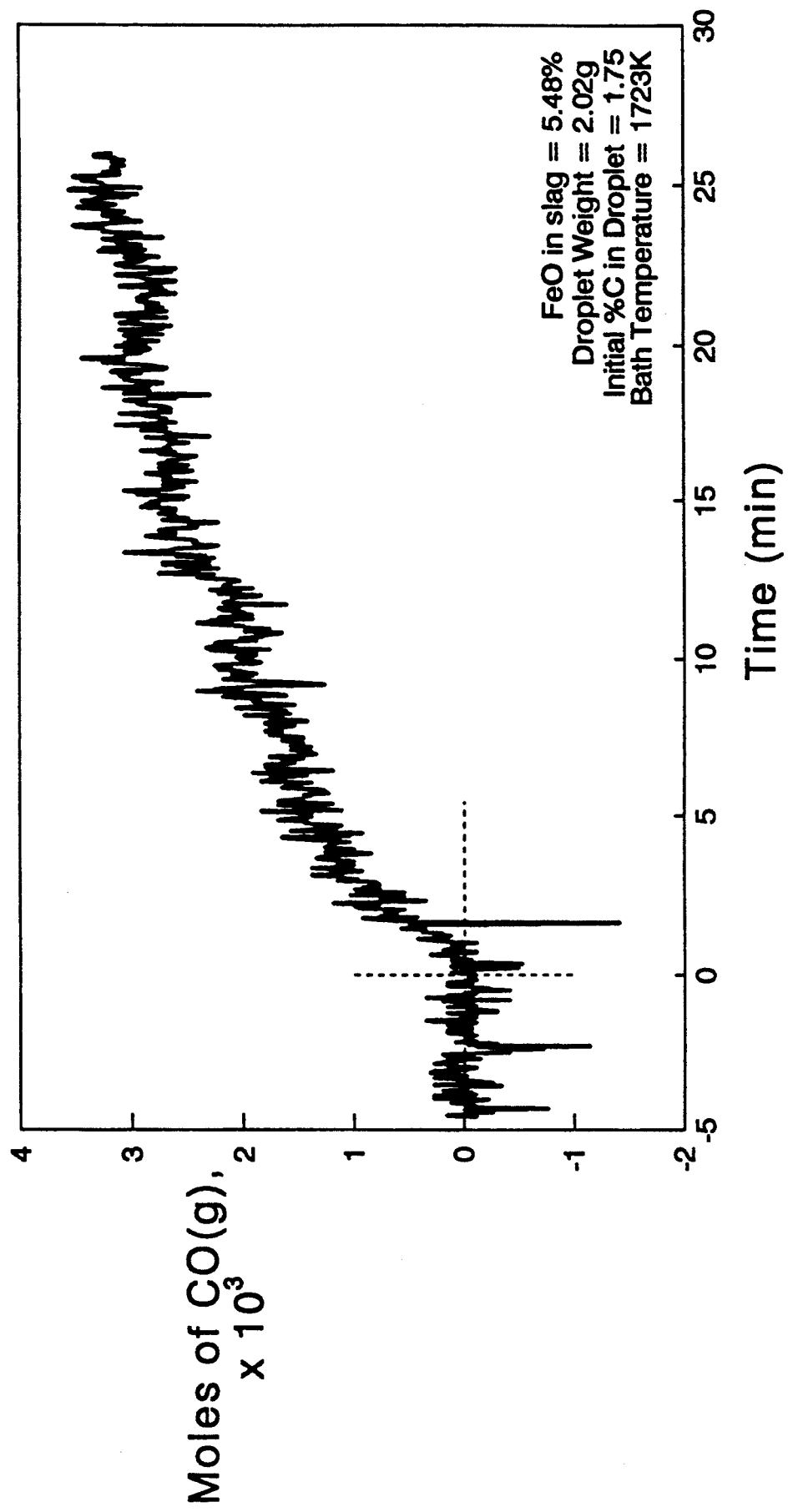

The trace of moles of CO(g) evolved from the reaction as a function of time for Type-D experiment is shown in FIG. 5. However, when a low carbon Fe-C droplet was dropped in a slag bath (no molybdenum foil present), no reaction took place; while, in this experiment (FIG. 5), reaction took place. This reconfirmed that the molybdenum foil was assisting the reaction.

Figure 6:
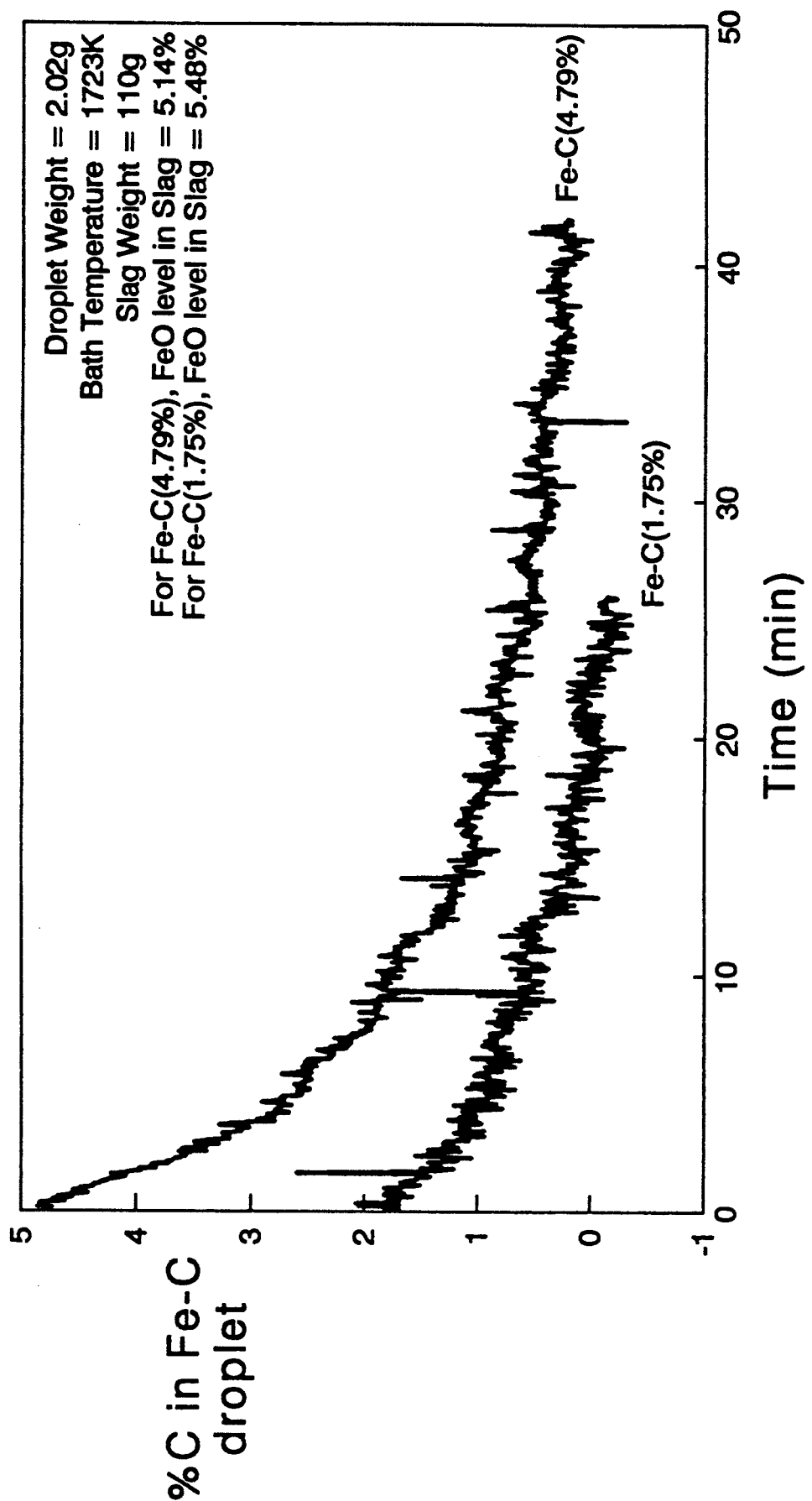
FIG. 6 is a graph showing % C in Fe-C droplets as a function of time for certain experiments in Example 2.

FIG. 6 is a plot of % C left in the Fe-C droplet versus time for Type-C and Type-D experiments. In both these experiments, the reaction proceeded to almost 0% C. The rates are very similar for both experiments Type-C and Type-D once the carbon level in experiment C dropped to 1.75%.

FIG. 7 gives a comparison of % C left in the Fe-C droplet versus time for Type-C experiment and Type-E experiment (1 mm, 0.11 mm and 0.01 mm molybdenum). As can be seen, though the reaction for the Type-E experiment proceeded to lesser extent than Type-C experiment, it was greater than the experiment in which no molybdenum foil was used.

The crucibles were cut open after the experiments were complete. For the 0.11 mm and 0.01 mm molybdenum experiments (Type-E experiments), no molybdenum foil was present. In contrast, for Type-C and Type-D experiments the molybdenum foil was intact. Therefore, it seemed that when the molybdenum foil was only at the base of the crucible, it was physically taking part in the reaction. However, when the entire crucible was lined with molybdenum foil, though it did not physically take part in the reaction the foil helped in the reaction to proceed beyond 2-3%C.

It is currently believed that the reaction stopped at 2-3%C (when no molybdenum foil was used) due to an electrochemical process. Although, the exact reaction mechanism is not yet completely understood, it is speculated that the reaction stopped due to the inability of the electrons to migrate across electron concentration gradient that existed in the slag phase boundary layer.

What is claimed is:

1. A process for improving the rate of metal production and FeO utilization in an iron and steelmaking process which uses Fe-C alloy droplets in an FeO containing slag and in which a charge build-up occurs in the slag at the slag-alloy interface comprising discharging the charge buildup in the slag at the slag-alloy interface.

2. The process of claim 1, wherein the charge build-up is discharged by contacting the slag alloy interface and the slag with an inert metallic conductor.

3. The process of claim 2, wherein the inert metal conductor is in the form of a coating to the interior surface of the container.

4. The process of claim 2, wherein the inert metallic conductor is in the form of a wire.

5. The process of claim 2, wherein the inert metallic conductor is in the form of a plate.

6. The process of claim 2, wherein the inert metallic conductor is in the form of a foil.

7. The process of claim 2, wherein the metallic conductor is disposed at the base of the container.

8. The process of claim 2, wherein the metallic conductor is selected from the group consisting of molybdenum, iridium, platinum, and tungsten.

9. The process of claim 2, wherein a sufficient amount of the inert metallic conductor is present to discharge the charge build-up in the slag.

10. The process of claim 9, wherein the charge build-up is present in the slag on and around the Fe-C metal droplets present in the slag.

11. The process of claim 7, wherein part of the metallic conductor extends out of the slag.

* * * * *